United States Patent

Rees et al.

[19]

[11] Patent Number: 6,040,988
[45] Date of Patent: Mar. 21, 2000

[54] CONVERTER WITH DC VOLTAGE INTERMEDIATE CIRCUIT AND METHOD FOR OPERATING SUCH A CONVERTER

[75] Inventors: Jochen Rees, Waldshut; Jürgen Steinke, Albbruck, both of Germany

[73] Assignee: Asea Brown Boveri AG, Baden, Switzerland

[21] Appl. No.: 09/139,125

[22] Filed: Aug. 25, 1998

[30] Foreign Application Priority Data

Aug. 25, 1997 [DE] Germany .................. 197 36 903

[51] Int. Cl.⁷ .................. H02M 5/45; H02M 7/122
[52] U.S. Cl. .................. 363/37; 363/56
[58] Field of Search .................. 363/34, 35, 37, 363/50, 55, 56

[56] References Cited

U.S. PATENT DOCUMENTS

| 5,187,652 | 2/1993 | Steimer | 363/37 |
| 5,272,617 | 12/1993 | Nakamura | 363/37 |
| 5,469,351 | 11/1995 | Masrur et al. | 363/56 |

FOREIGN PATENT DOCUMENTS

| 0 332 974 A1 | 9/1989 | European Pat. Off. . |
| 42 10 443 A1 | 10/1992 | Germany . |
| 195 46 132 A1 | 6/1997 | Germany . |

*Primary Examiner*—Matthew Nguyen
*Attorney, Agent, or Firm*—Oblon, Spivak, McClelland, Maier & Neustadt, P.C.

[57] ABSTRACT

A converter with a DC voltage intermediate circuit and including a rectifier circuit having an AC voltage input and a DC voltage output, which rectifier circuit can be connected to a power supply system, an invertor circuit having a DC voltage input and an AC voltage output, and a DC voltage intermediate circuit, which is arranged between the DC voltage output of the rectifier circuit and the DC voltage input of the invertor circuit. Also included is two connecting lines, leading from the DC voltage output of the rectifier circuit to the DC voltage input of the invertor circuit, and at least one intermediate circuit capacitor arranged between the connecting lines. A simplified structure is achieved by virtue of the fact that in order to protect the converter in the event of a short circuit, a first controllable semiconductor switch is arranged in at least one of the connecting lines between the DC voltage output of the rectifier circuit and the at least one intermediate circuit capacitor.

12 Claims, 2 Drawing Sheets

CONVERTER WITH DC VOLTAGE INTERMEDIATE CIRCUIT AND METHOD FOR OPERATING SUCH A CONVERTER

BACKGROUND OF THE INVENTION

1. Field of the Invention

The present invention is concerned with the field of power electronics. It relates to a converter with a DC voltage intermediate circuit, comprising a rectifier circuit having an AC voltage input and a DC voltage output, which rectifier circuit can be connected to a power supply system, an invertor circuit having a DC voltage input and an AC voltage output, and a DC voltage intermediate circuit which is arranged between the DC voltage output of the rectifier circuit and the DC voltage input of the invertor circuit and comprises two connecting lines leading from the DC voltage output of the rectifier circuit to the DC voltage input of the invertor circuit, and at least one intermediate circuit capacitor arranged between the connecting lines.

The invention furthermore relates to a method for operating such a converter.

2. Discussion of Background

Converters with a DC voltage intermediate circuit have been known and used for a long time in power electronics. In said converters, the AC voltage from a power supply system is converted into a DC voltage in a rectifier circuit on the input side and smoothed by means of an intermediate circuit capacitor in the subsequent DC voltage intermediate circuit. The DC voltage across the intermediate circuit capacitor is then converted into another AC voltage in a subsequent invertor circuit.

In the event of a short circuit in the invertor, nowadays use is made for example of fuses on the DC voltage side of the rectifier circuit. Another option is to use fuses in the AC leads from the power supply system to the rectifier circuit. A so-called fuseless circuit is also possible. In this case, the short circuit has to be disconnected on the power supply system side by a power circuit-breaker, but in this case the reactance of the power feeding must be large enough to prevent an impermissibly high short-circuit current. Before the closing of the power circuit-breaker on the power supply system side, the intermediate circuit capacitor is charged by an auxiliary power supply unit to a voltage which is large enough to prevent impermissible overcharging after connection of the power circuit-breaker. It is also known from low-voltage converters to replace at least three diodes of the rectifier circuit by thyristors, at least one of which is bridged by a high-value resistor. After connection of the power circuit-breaker, the intermediate circuit capacitor is charged via said resistor. Afterwards the thyristors receive a continuous trigger pulse and are operated as diodes.

In the case of the known solutions, however, various problems arise with regard to the protection function and the charging function:

Fuses for interrupting medium-voltage circuits are expensive. Moreover, they have to be replaced in the event of a fault or short circuit, which increases the costs for the stocking of spare parts and repairs.

Fuses on the AC side isolate only the converter from the power-feeding system. During a short circuit in the invertor, the majority of the energy of the intermediate circuit capacitor is transferred to the inductances contained in the shorted circuit. After the zero crossing of the capacitor voltage, the current commutates into the diodes of the rectifier circuit. It remains there until all of the energy is converted into heat. If the diodes of the rectifier circuit are only designed for normal operation, they can be described in this fault situation. The same phenomenon also occurs with a fuseless circuit. In both cases, this problem can be avoided by an inductor between the rectifier circuit and the intermediate circuit capacitor. However, an additional inductor considerably increases the costs of the converter.

The additionally required auxiliary charging device increases the costs of the converter.

Thyristors in the rectifier circuit likewise increase the equipment costs.

Both the auxiliary charging device and the thyristors in the rectifier circuit have no significance for all the other (normal) operating states.

SUMMARY OF THE INVENTION

Accordingly, one object of the invention is to provide a novel converter with a DC voltage intermediate circuit which, in a simple manner and with low additional costs, has reliable protection in the event of a short circuit and, with very simple means, enables charging of the intermediate circuit capacitor, and also to specify a method for operating said converter.

In the case of a converter of the type mentioned in the introduction, the object is achieved by the fact that in order to protect the converter in the event of a short circuit, a first controllable semiconductor switch is arranged in at least one of the connecting lines between the DC voltage output of the rectifier circuit and the at least one intermediate circuit capacitor. In the event of a short circuit in the invertor circuit, the first controllable semiconductor switch is switched off at the instant when the short circuit is detected. Rectifier circuit and intermediate circuit capacitor are isolated from one another as a result of the first controllable semiconductor switch being switched off. Consequently, a short-circuit current in the invertor can no longer commutate into the rectifier circuit. The switching off takes place nondestructively and makes no specific requirements of the reactance of the power supply system.

A first preferred embodiment of the converter according to the invention has the characteristic that the invertor is designed either as a two-point invertor, and that a first controllable semiconductor switch is arranged only in one of the connecting lines between the DC voltage output of the rectifier circuit and the intermediate circuit capacitor, or that the invertor is designed as a three-point invertor with a center tap, that an intermediate circuit capacitor is respectively arranged between the center tap and each of the connecting lines, and wherein a first controllable semiconductor switch is arranged in each of the connecting lines between the DC voltage output of the rectifier circuit and the intermediate circuit capacitor, and that in both cases the invertor contains second controllable semiconductor switches, and that the first controllable semiconductor switch or switches in the connecting lines are of the same design as the second controllable semiconductor switches of the invertor. As a result of this, the converter can be constructed and maintained in a particularly simple and cost-effective manner because it is possible to use the same power semiconductor modules with their supplementary circuitry both for the invertor itself and as a circuit-breaker in the DC voltage intermediate circuit.

A second preferred embodiment of the converter according to the invention is distinguished by the fact that a resistor is respectively connected in parallel with the first controllable semiconductor switch or the first controllable semiconductor switches for the purpose of charging the intermediate circuit capacitor or the intermediate circuit capacitors. The resistor can be designed with such a high resistance that it does not impair the protection function. In order to charge the intermediate circuit capacitor, the power circuit-breaker of the power supply system is closed with the first controllable semiconductor switch switched off (open). The intermediate circuit capacitor is then charged via the parallel resistor. As soon as the voltage across the capacitor has reached a value large enough to prevent later overcharging, the first controllable semiconductor switch is activated (closed).

The inventive method for operating the converter has the characteristic that the first controllable semiconductor switch is held closed during normal operation of the converter, and that the first controllable semiconductor switch is opened in the event of a short circuit in the invertor circuit.

A preferred embodiment of the method according to the invention is distinguished by the fact that in the course of start-up of the converter, before the first controllable semiconductor switch is closed, first of all the at least one intermediate circuit capacitor is charged past the open first controllable semiconductor switch, and that the first controllable semiconductor switch is only closed when the at least one intermediate circuit capacitor has reached a predetermined charging voltage.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
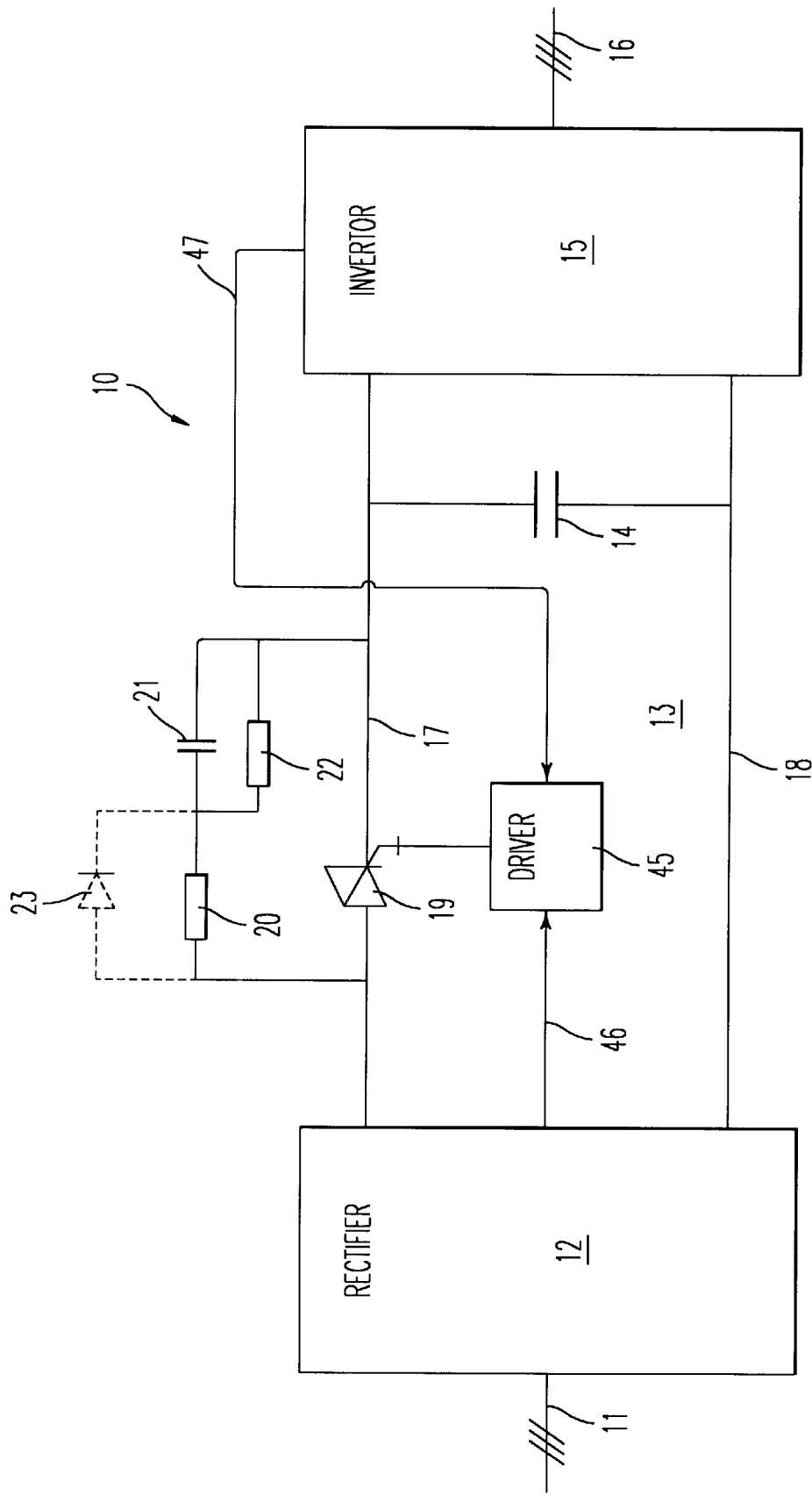
FIG. 1 shows, in a simplified circuit diagram, a first preferred exemplary embodiment of a converter according to the invention with a two-point invertor at the output and a semiconductor switch for short-circuit protection.

Referring now to the drawings, wherein like reference numerals designate identical or corresponding parts throughout the several views, FIG. 1 illustrates, in a simplified circuit diagram, a first preferred exemplary embodiment of a converter according to the invention. The converter 10 comprises, on the input side, a rectifier circuit (for example a diode bridge) 12 and, on the output side, an invertor circuit 15, and also a DC voltage intermediate circuit 13, which is arranged between the rectifier circuit 12 and the invertor circuit 15. The rectifier circuit 12 is connected by an AC voltage input to a (usually two-, three-, six- or polyphase) power supply system 11. It has a DC voltage output which is connected via two connecting lines 17, 18 to a DC voltage input of the invertor circuit 15. Arranged between the connecting lines 17 and 18 is an intermediate circuit capacitor 14, which forms the DC voltage intermediate circuit 13 together with the connecting lines 17, 18. The invertor circuit 15 has a (polyphase) AC voltage output 16, to which, for example, a load (not illustrated) is connected. The function and method of operation of such a converter are generally known and, therefore, will not be explained in any further detail here.

What is novel about the circuit represented in FIG. 1 is a controllable semiconductor switch 19, which is inserted into the connecting line 17 between the rectifier circuit 12 and the intermediate circuit capacitor 14. The controllable semiconductor switch 19 is preferably of the same design (has the same electrical and performance data) as those controllable semiconductor switches which are used in the invertor circuit 15 for converting the DC voltage of the DC voltage intermediate circuit into the AC output voltage. It is designed for example as a reverse conducting GTO. The controllable semiconductor switch 19 is connected (by its control input) to a drive circuit 45 which, for its part, receives control information, via control lines 46 and 47, from the rectifier circuit 12 (from the power supply system) and from the invertor circuit 15, respectively.

In the event of a short circuit in the invertor circuit 15 (in the invertor), a control signal is emitted via the control line 47 to the drive circuit 45 at the instant when the short circuit is detected, which drive circuit in turn immediately switches off the controllable semiconductor switch 19. In comparison with the operational current, the current through the semiconductor switch 19 in the event of a short circuit rises only slowly since a reactance which is high measured by the time scales of the short-circuit process is present in the power supply system 11. As a result, the current to be disconnected is increased only slightly from the operational current. In order to avoid overvoltages after the switching-off operation, the controllable semiconductor switch 19 may be connected up to a snubber, which, according to FIG. 1, is composed of a parallel-connected series circuit formed by a first resistor 20 and a capacitor 21, but may also have, in addition, a diode 23 (depicted by dashed lines) in parallel with the first resistor.

The rectifier circuit 12 and the intermediate circuit capacitor 14 are isolated from one another as a result of the semiconductor switch 19 being switched off in the event of a short circuit. As a result, a short-circuit current in the invertor circuit 15 can no longer commutate into the rectifier circuit 12. The switching off takes place nondestructively and makes no specific requirements of the reactance of the power supply system. For the purpose of charging the intermediate circuit capacitor 14, said charging being performed in the course of preparing the converter 10 for operation, a second resistor 22 is provided in the circuitry of the controllable semiconductor switch 19, which second resistor is connected in parallel with the semiconductor switch 19 and bridges the capacitor 21. The resistor 22 can be designed with such a high resistance that it does not impair the protection function of the opened semiconductor switch 19.

For the purpose of charging the intermediate circuit capacitor 14, the power circuit-breaker 19 (not shown in FIG. 1) of the power supply system 11 is closed with the semiconductor switch 19 switched off. The intermediate circuit capacitor is then charged via the resistor 22 (and the resistor 21 or the diode 23). As soon as the voltage across the intermediate circuit capacitor has reached a predetermined value large enough to prevent later overcharging, a signal that signals the charge state passes via the control line 47 to the drive circuit 45 and the semiconductor switch 19 is activated. After the decay of a short transient recovery process that may possibly have been triggered by the activation, the converter is thus ready for operation.

The circuit according to the invention, as becomes clear from the example of FIG. 1, also has a further advantage: in the event of an undesired interruption of the power supply system 11, the power circuit-breaker of the power supply system does not need to be actuated. To date, uncontrolled charging of the intermediate circuit capacitor upon restoration of the voltage in the power supply system could only be prevented by actuating said power circuit-breaker. The converter according to the invention enables this problem to be resolved differently. When the interruption of the power supply system has been identified, an interruption signal is forwarded via the signal line 46 to the drive circuit 45, which immediately switches off the semiconductor switch 19. Upon restoration of the voltage of the power supply system, the controlled charging of the intermediate circuit capacitor 14, which charging has already been described above, is automatically initiated via the resistor 22 and leads to the semiconductor switch 19 being switched on when the predetermined charging voltage is reached (signal via signal line 47). In this way, the power circuit-breaker need not be switched and can therefore be spared.

Figure 2:
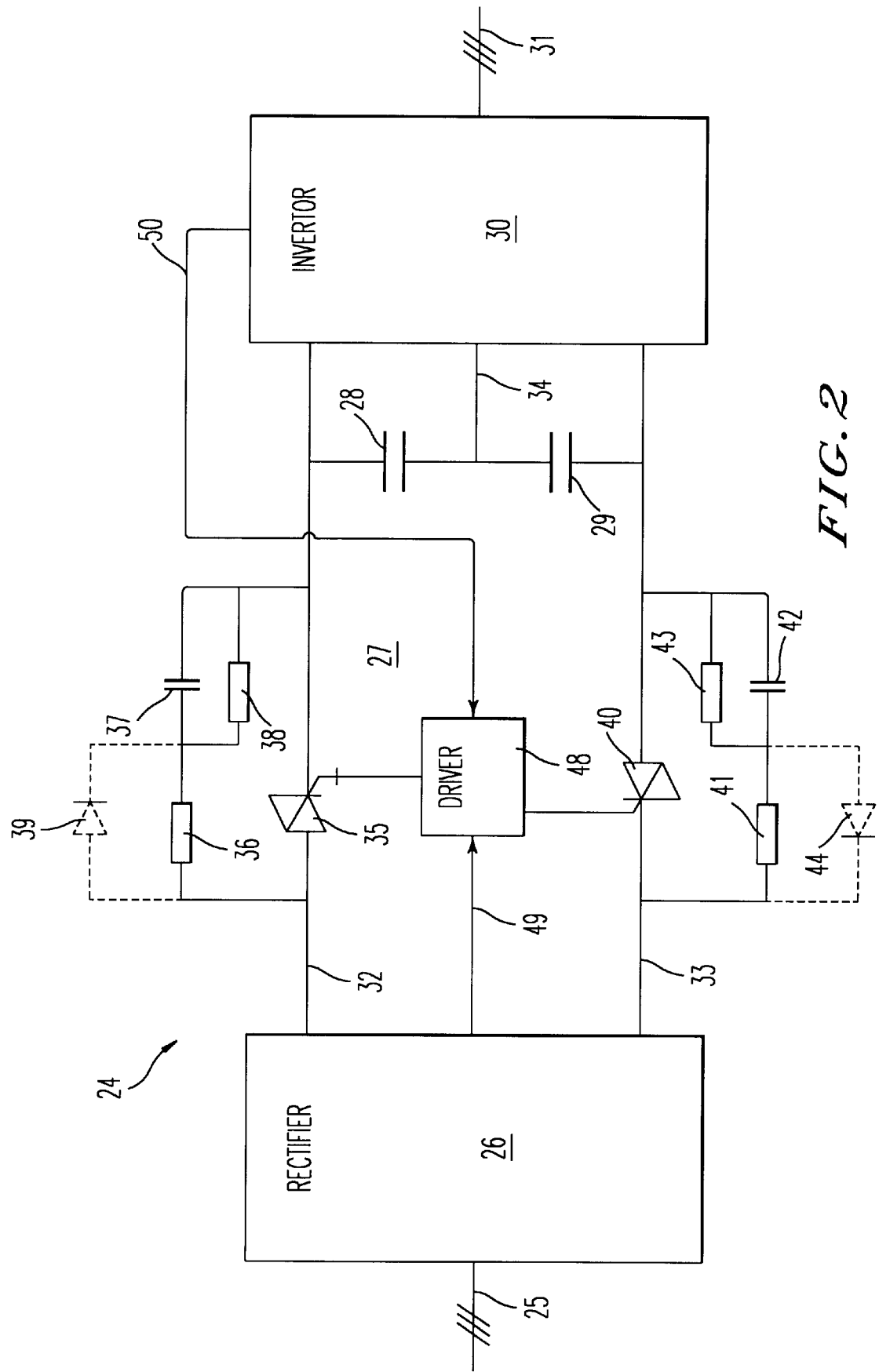
FIG. 2 shows, in a simplified circuit diagram, a second preferred exemplary embodiment of a converter according to the invention with a three-point invertor at the output and two semiconductor switches for short-circuit protection.

In the circuit according to FIG. 1, the invertor circuit 15 is a two-point invertor. The converter structure illustrated in FIG. 1 can, in principle, be adopted when a three-point invertor is used as invertor circuit. However, the advantage that the controllable semiconductor switch in the intermediate circuit (19 in FIG. 1) can be designed identically to the semiconductor switches used in the invertor will then be lost since the semiconductor switch in the intermediate circuit will have to be rated for the doubled voltage. Therefore, in the case of a three-point invertor, use is preferably made of the circuit variant represented in the example of FIG. 2, which has two semiconductor switches in the intermediate circuit: in the exemplary embodiment of FIG. 2, as well, the converter 24 comprises a rectifier circuit 26 connected to a power supply system 25, an invertor circuit 30 equipped with an AC voltage output 31, and, arranged inbetween, a DC voltage intermediate circuit 27 having two connecting lines 32 and 33 and two intermediate circuit capacitors 28 and 29, which are respectively connected between a center tap on the invertor circuit 30 and one of the connecting lines 32, 33.

In contrast to the exemplary embodiment of FIG. 1, in this case a controllable semiconductor switch 35, 40 is now arranged in each connecting line 32, 33. Each of the controllable semiconductor switches 35, 40 is provided with snubber circuitry comprising two resistors 36, 38 and 41, 43, respectively, a capacitor 37 and 42, respectively, and, if appropriate, a diode 39 and 44, respectively, the function of which is the same as in the case of the semiconductor switch 19 in FIG. 1 and has already been described above. Here, too, the semiconductor switches 35, 40 are controlled by a drive circuit 48 which receives its control signals in the manner already explained via control lines 49 and 50 from the rectifier circuit 26 and the invertor circuit 30, respectively. Statically and dynamically uniform voltage division between the two semiconductor switches 35 and 40 is ensured by the doubling of the complete circuit, with the result that said switches can be rated identically to the semiconductor switches in the invertor 30.

Overall, the invention provides a converter with DC voltage intermediate circuit which, with little additional outlay, ensures reliable protection in the event of a short circuit, incurs a low maintenance outlay, enables simple charging of the intermediate circuit capacitor prior to the beginning of operation and spares the power circuit-breaker in the event of interruptions of the power supply system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by patent of the United States is:

1. A converter comprising:

a rectifier circuit having an AC voltage input and a DC voltage output and configured to be connected to a power supply system;

an invertor circuit having a DC voltage input and an AC voltage output;

a DC voltage intermediate circuit arranged between the DC voltage output of the rectifier circuit and the DC voltage input of the inverter circuit; and two connecting lines, leading from the DC voltage output of the rectifier circuit to the DC voltage input of the invertor circuit, wherein the invertor comprises a three-point inverter with a center tap, wherein intermediate circuit capacitors are respectively arranged between the center tap and each of the connecting lines, and wherein in order to protect the converter in the event of a short circuit, first controllable semiconductor switches are arranged in each of the connecting lines between the DC voltage output of the rectifier circuit and a respective intermediate circuit capacitor.

2. The converter as claimed in claim 1, wherein the invertor includes second controllable semiconductor switches, and wherein the first controllable semiconductor switches in the connecting lines are of the same design as the second controllable semiconductor switches of the invertor.

3. The converter as claimed in claim 1, wherein a resistor is respectively connected in parallel with each of the first controllable semiconductor switches for the purpose of charging the intermediate circuit capacitors.

4. The converter as claimed in claim 1, wherein the first controllable semiconductor switches are controlled by a drive circuit, and wherein the drive circuit is connected via a first control line to the invertor circuit.

5. The converter as claimed in claim 4, wherein the drive circuit is connected via a second control line to the rectifier circuit.

6. A method of operating a converter including a rectifier circuit having an AC voltage input and a DC voltage output, and configured to be connected to a power supply system, an invertor circuit having a DC voltage input and an AC voltage output, a DC voltage intermediate circuit arranged between the DC voltage output of the rectifier circuit and the DC voltage input of the inverter circuit, and two connecting lines, leading from the DC voltage output of the rectifier circuit to the DC voltage input of the invertor circuit, wherein the invertor comprises a three-point inverter with a center tap, wherein intermediate circuit capacitors are respectively arranged between the center tap and each of the connecting lines, and wherein in order to protect the converter in the event of a short circuit, first controllable semiconductor switches are arranged in each of the connecting lines between the DC voltage output of the rectifier circuit and a respective intermediate circuit capacitor, the method comprising the steps of:

holding closed the first controllable semiconductor switches during normal operation of the converter; and opening the first controllable semiconductor switches in the event of a short circuit in the invertor circuit.

7. The method as claimed in claim 6, further comprising the steps of:

charging the intermediate circuit capacitors past the open first controllable switches during a start-up of the converter before the first controllable semiconductor switches are closed; and closing the first controllable semiconductor switches only when the intermediate circuit capacitors have reached a predetermined charging voltage.

8. The method as claimed in claim 6, further comprising the steps of:

opening the first controllable semiconductor switches when an interruption occurs in the power supply system;

charging the intermediate circuit capacitors past the open first controllable switches after restoration of the voltage of the power supply system; and closing the first controllable semiconductor switches only when the intermediate circuit capacitors have reached a predetermined charging voltage.

9. The converter as claimed in claim 2, wherein a resistor is respectively connected in parallel with each of the first controllable semiconductor switches for the purpose of charging the intermediate circuit capacitors.

10. The converter as claimed in claim 2, wherein the first controllable semiconductor switches are controlled by a drive circuit, and wherein the drive circuit is connected via a first control line to the inventor circuit.

11. The converter as claimed in claim 3, wherein the first controllable semiconductor switches are controlled by a drive circuit, and wherein the drive circuit is connected via a first control line to the inventor circuit.

12. The method as claimed in claim 7, further comprising the steps of:

opening the first controllable semiconductor switches opened when an interruption occurs in the power supply system;

charging the intermediate circuit capacitors past the open first controllable switches after restoration of the voltage of the power supply system; and closing the first controllable semiconductor switches only when the intermediate circuit capacitors have reached a predetermined charging voltage.

* * * * *